Jan. 30, 1962 C. H. HEUER 3,019,401

COLOR TELEVISION

Filed June 15, 1960 2 Sheets-Sheet 1

INVENTOR.
Charles H. Heuer
BY John J. Pederson
Atty.

Jan. 30, 1962 C. H. HEUER 3,019,401

COLOR TELEVISION

Filed June 15, 1960

2 Sheets-Sheet 2

INVENTOR.
Charles H. Heuer
BY John J. Peterson
Atty.

3,019,401

COLOR TELEVISION

Charles H. Heuer, Glencoe, Ill., assignor to Zenith Radio Corporation, a corporation of Delaware
Filed June 15, 1960, Ser. No. 36,428
5 Claims. (Cl. 333—77)

The present invention relates to color television and more particularly to an interstage coupling network applicable to the intermediate-frequency amplifier section of a color television receiver.

Color television receivers having conventional intermediate-frequency stages utilize various networks for separating desired information from the intermediate-frequency television signal containing both video and audio components and for transmitting this information to appropriate sections of the receiver. It is a common practice in color receivers to use one detector stage for extracting video components from the signal while utilizing another detector stage to obtain desired audio-frequency components as well as conventional synchronizing and control information. To prevent the transmission of erroneous information to the networks which follow the video detector stage, a method is needed to adequately attenuate certain components which appear at the input of this stage. Unfortunately sound-frequency components heterodyne with certain video components, both being part of the intermediate-frequency signal present at the input of the video detector stage, and produce intermodulation products which fall in the range of the video information signals. As a result, these unwanted signals are erroneously transmitted to the video processing networks and result in degradation of the reproduced color picture. One example of such an intermodulation product is the 900 kc. beat between sound-frequency and color-frequency components.

Typical of previously used attenuating networks have been both conventional trapping circuits and cancelling or bridge-type circuits. These circuits have either failed to provide enough attenuation of sound-frequency components or have attenuated video signals in addition to the sound components. They have also unnecessarily reduced the overall bandwidth of the intermediate-frequency signal after the signal has been translated through the coupling circuit.

It is an object of this invention to provide a new and more efficient intermediate-frequency (I.-F.) coupling circuit for attenuating specific components of the signal translated in the I.-F. amplifier section of a color television receiver.

It is a further object of this invention to provide an I.-F. coupling circuit having substantial improvement in overall gain while adequately attenuating undesired signal components.

It is also an object of this invention to provide an I.-F. coupling circuit which does not substantially reduce the bandwidth of the intermediate-frequency section of a color television receiver.

In accordance with this invention, a new and improved intermediate-frequency coupling network for a color television receiver for translating an intermediate-frequency signal including video components and a sound-signal component and for attenuating the sound frequency component comprises a transformer having a primary winding, a secondary winding inductively coupled to the primary winding, and a tertiary winding tightly inductively coupled to one of the aforementioned windings. The network further comprises a resonant circuit including an inductor separate from said windings and tuned approximately to the frequency of the sound component, at least a portion of the resonant circuit being coupled in parallel across the tertiary winding and one end of the resonant circuit being coupled to one end of the secondary winding, and means for impressing the intermediate-frequency signal across the primary winding. The network also comprises an output circuit including the secondary winding and at least a portion of the resonant circuit coupled in series opposition for developing voltages of opposing phase and substantially equal magnitude at a frequency corresponding to the sound frequency component.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
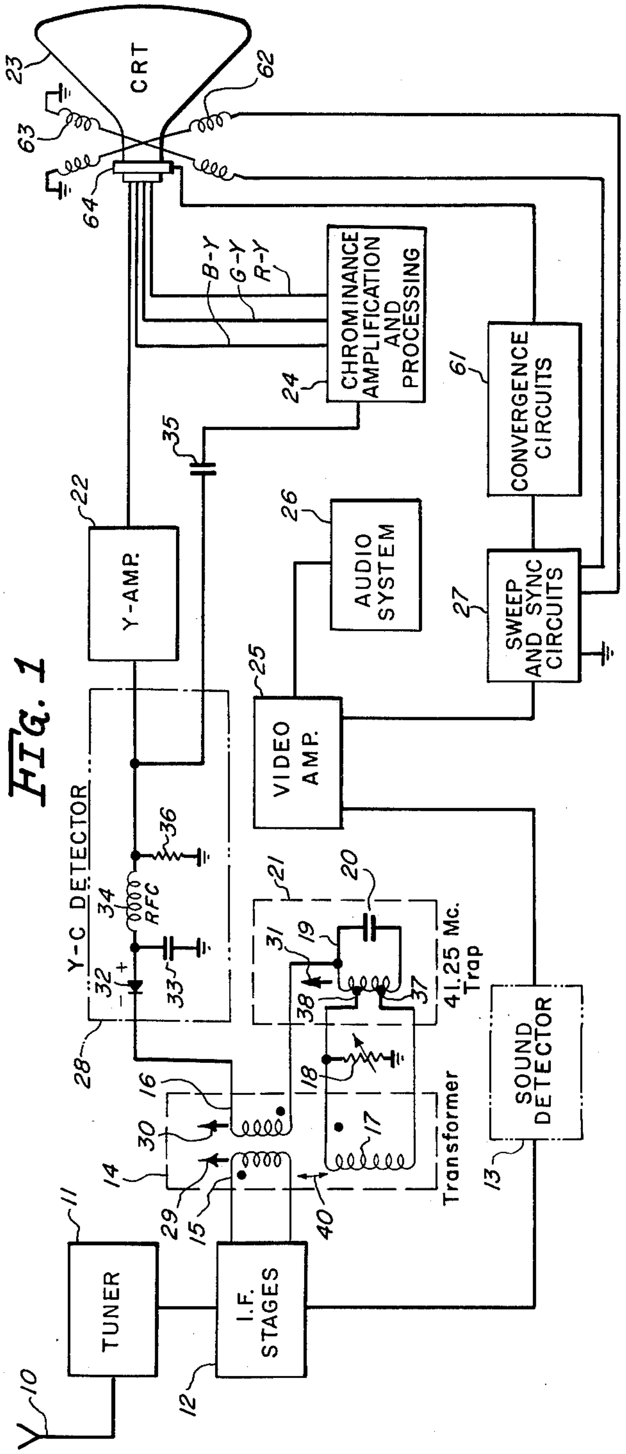
FIGURE 1 is a combined block and schematic circuit diagram of a color television receiver embodying the invention.

In the color television receiver of FIGURE 1, composite color television signals are received by an antenna 10 and applied to the input circuit of a conventional television tuner 11. Tuner 11 comprises one or more stages of radio-frequency amplification and a converter or first detector, as is well known in the art. Intermediate-frequency composite color television signals developed by tuner 11 are applied to an intermediate-frequency (I.-F.) amplifier 12 of any desired number of stages. The amplified intermediate-frequency signal from I.-F. amplifier 12 is concurrently applied to a pair of second detectors 13 and 28, one for deriving the sound signal components and the other for deriving the brightness (Y) and chrominance (C) signal components. The sound detector 13 is also used to derive synchronizing information in conventional fashion. However, it is common practice to utilize either detector to obtain synchronizing information. The coupling circuits from amplifier 12 to brightness and chrominance detector 28 include a transformer 14 and a trap circuit 21 which in accordance with the invention are constructed and interconnected in a novel manner and cooperate to eliminate the sound components from the composite color signal applied to the brightness and chrominance detector.

The detected brightness signal, which is commonly designated the Y signal, is applied from detector 28 to a Y amplifier 22 of any desired number of stages, and the amplified brightness signal is impressed on the cathodes of each of the three electron guns of a conventional 3-beam tri-color kinescope 23, in a conventional manner.

The detected composite video signal from sound detector 13 is amplified in a video amplifier 25 of one or more stages. The amplified composite video signal developed by amplifier 25 is applied to conventional scanning signal circuits 27 which include a synchronizing-signal separator, a line-frequency oscillator, phase detector and frequency control tube to provide automatic-frequency-controlled line-scanning signals, and a field-scanning generator. The scanning generators of deflection circuits 27 are coupled to respective line-frequency and field frequency magnetic deflection elements 62 and 63 associated with kinescope 23, in a conventional manner. The line-frequency and field-frequency scanning signals are also employed, in conventional circuits 61, to develop appropriate dynamic convergence signals for application to a convergence yoke 64 also associated with tri-color kinescope 23. In the usual receiver, an automatic gain control potential is also developed in scanning circuit system 27 for application to tuner 11 and I.-F. amplifier 12 as is well understood in the art.

Intercarrier sound signals are also derived from the output circuits of video amplifier 25, and are applied to a conventional audio system 26 which may comprise a limiter, a sound detector, an audio amplifier of any desired number of stages, and a loudspeaker or other sound-reproducing device.

Detected composite video signals from $Y-C$ detector 28 are also applied to suitable chrominance amplification and processing circuits 24 which may be of entirely conventional construction. In a typical color television receiver, these circuits include one or more stages of chrominance amplification, a color burst amplifier and separator, a color reference oscillator with associated automatic frequency control phase detector and frequency control stages, a color killer, and a pair of synchronous demodulators for developing three color-difference signals $R-Y$, $G-Y$, and $B-Y$ corresponding to the chrominance information associated with the three primary colors, red, green and blue. The color-difference signals developed by circuits 24 are respectively applied to the control grids of the three electron guns of tri-color kinescope 23, in a manner well known in the art. If desired, chrominance amplification and processing circuits 24 may also comprise appropriate automatic chrominance control circuits, and, of course, appropriate controls for adjusting hue and saturation of the reproduced image.

With the exception of the inter-coupling circuits between I.-F. amplifier 12 and brightness-chrominance detector 28, and the relationship between these inter-coupling circuits and the brightness-chrominance detector itself, the construction and operation of the color television receiver of FIGURE 1 may be entirely conventional. In accordance with the invention, inter-coupling transformer 14 and trap circuit 21 are constructed and inter-related in a novel manner to provide both substantially improved sound rejection and improved intermediate-frequency color video signal transmission to brightness-chroma detector 28.

In the embodiment of FIGURE 1, inter-coupling transformer 14 comprises a primary winding 15, a secondary winding 16, and a tertiary winding 17 all wound on a common coil form. Preferably, primary and tertiary windings 15 and 17 are tightly inter-coupled; this may be accomplished by placing the windings in very close proximity, by using windings of bifilar construction, or by positioning the windings about a common conventional ferromagnetic core. This tight coupling is schematically represented in the drawing by arrow 40. Ferromagnetic tuning cores 29 and 30 are provided for primary and secondary windings 15 and 16 respectively, as is customary in the construction of double-tuned coupling transformers. With this construction, the primary and secondary windings 15 and 16 may be tuned without substantially affecting the intercoupling between primary and tertiary windings 15 and 17. Inter-coupling transformer 14 is enclosed within a metal can which serves as a magnetic shield, as indicated by the broken line representation in the drawing.

The high-potential terminal of secondary winding 16 is coupled to the negative terminal of a crystal diode 32, the positive terminal of which is coupled to ground through a load circuit comprising parallel resistance and capacitance elements 36 and 33 respectively; a radio-frequency choke 34 is coupled between the positive terminal of diode 32 and the ungrounded terminal of resistor 36, while condenser 33 is coupled directly between the positive terminal of diode 32 and ground.

Load resistor 36 is coupled to the input circuit of Y-amplifier 22 and, through a coupling condenser 35, to chrominance amplification and processing circuits 24.

The low-potential terminal of secondary winding 16 is connected to one terminal of an inductance coil 19 which is provided with two intermediate taps 37 and 38 and which is connected in parallel with a condenser 20 to constitute a parallel resonant circuit. Taps 37 and 38 on inductance coil 19 are connected to the respective terminals of tertiary winding 17 of intercoupling transformer 14, and tap 38 is returned to ground through a variable resistor 18. Parallel resonant circuit 19, 20 is nominally tuned slightly above 41.25 megacycles, the sound carrier frequency component of the I.-F. composite color signal, and an adjustable ferromagnetic tuning core 31 is associated with coil 19 to permit fine adjustment of the trap circuit frequency. Resonant circuit 19, 20 is enclosed in a conductive can designated by broken lines 21 in the drawing.

Now, referring more specifically to the operation of the intermediate-frequency portion of the receiver and the manner in which the important new and useful results of the present invention are achieved, the intermediate-frequency amplifier section of the receiver of FIGURE 1 may be operated at the 45.75 megacycle picture carrier frequency which is customarily used at the present time in receivers of this type. The brightness and chrominance components are included in an I.-F. band which is established from a frequency of 41.75 megacycles, representative of the useful low-frequency limit of the chrominance modulation components, to a frequency somewhat above the 45.75 megacycle picture carrier frequency. The sound carrier component of the intermediate-frequency composite color signal occurs at 41.25 megacycles, and the sound carrier plus its modulation components must, of course, be included in the pass-band of intermediate-frequency amplifier stages 12, for application to the sound detector 13. However, the sound carrier and its modulation components must be substantially suppressed or deleted from the composite intermediate-frequency signal as applied to the brightness chrominance detector 28, in order to avoid undesired intermodulation interference in the reproduced image. Such sound carrier rejection has been accomplished in prior art receivers with intercoupling network and trap arrangements primarily of two general types, exemplified by the prior art circuits of FIGURES 2 and 3, and the operation and advantages of the present invention may be more readily appreciated with the construction and operation of such prior circuits in mind.

Figure 2:
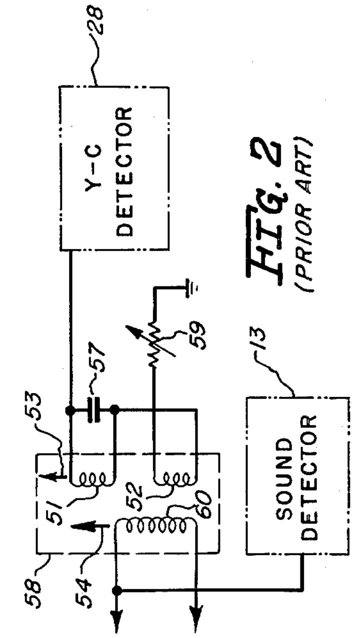
FIG. 2 (PRIOR ART)
FIGURES 2 and 3 are schematic diagrams of typical prior art I.-F. coupling circuits.

FIGURE 2, which is a fragmentary circuit diagram showing the intercoupling circuits between the last intermediate-frequency amplifier and the picture detector 28, exemplifies an intercoupling circuit of the cancellation type which has been widely used in prior art color television receivers. The amplified intermediate-frequency composite color signal is impressed across the primary winding 60 of a coupling transformer 58 which also comprises secondary and tertiary or trap windings 52 and 51 respectively, which are both inductively coupled to primary winding 60. Trap winding 51 is tuned by means of a parallel-connected condenser 57. Secondary winding 52 is connected in series with the trap circuit comprising winding 51 and condenser 57 in the input circuit of brightness-chrominance detector 28, and is returned to ground through a variable resistor 59. Primary and secondary windings 60 and 52 are wound tightly coupled to each other about the same ferromagnetic tuning core 54 and together with their associated distributed and circuit capacities (not shown), comprise a single-tuned circuit. Trap winding 51 is provided with ferromagnetic tuning core 53.

In operation, windings 60 and 52 and their associated capacity are tuned by means of ferromagnetic core 54 to accept the I.-F. composite color signal from intermediate-frequency amplifier 12. The trap circuit comprising tertiary winding 51, its associated distributed capacity (not shown), and condenser 57 is tuned by ferromagnetic core 53 to a frequency slightly higher than the I.-F. sound carrier frequency; in actual practice, this adjustment is performed empirically to obtain optimum sound rejection in the I.-F. composite color signal applied to brightness-chrominance detector 28. Variable resistor 59 is also adjusted empirically in the same manner, to optimize the sound rejection to detector 28. Secondary and tertiary windings 52 and 51 are wound with such polarity relative to each other and to primary winding 60 that substantially equal and opposite signal components are induced in windings 52 and 51 at the sound-carrier frequency of 41.25 megacycles. Thus, at the sound-carrier frequency, substantially complete cancellation is obtained in the input circuit to brightness-chrominance detector 28.

Figure 4:
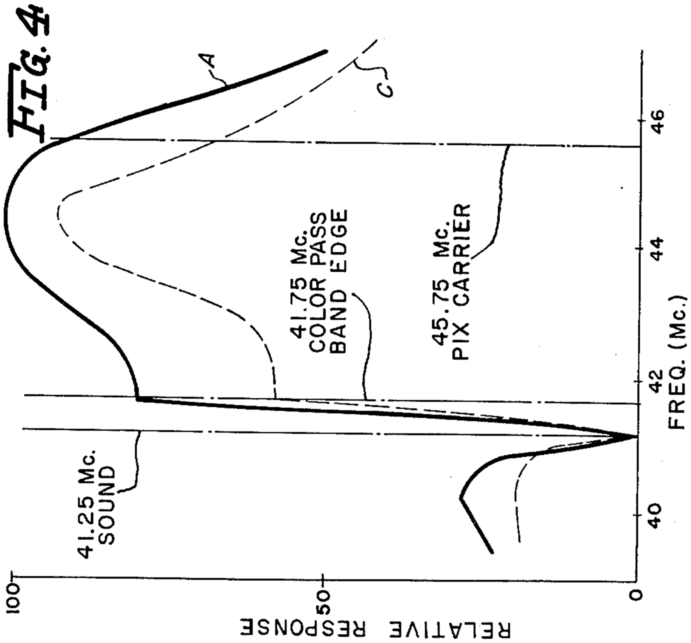
FIGURES 4 and 5 are graphical representations of certain operating characteristics of the circuits of FIGURES 1–3 illustrating some of the advantages obtained by utilizing the invention.

The gain-bandwidth characteristic provided with the type of intercoupling circuit shown in FIGURE 2 is plotted in the graphical representation of FIGURE 4 as dotted line curve C on coordinate axes in which the relative response or gain is plotted as a function of frequency. It may be seen from an inspection of curve C of FIGURE 4 that the 41.25 megacycle sound component is virtually eliminated from the input signal to brightness-chrominance detector 28, while the 45.75 megacycle picture carrier and its modulation components, as well as the color sub-carrier (42.16 megacycles) and its modulation components constituting the required chrominance information, are efficiently translated to the input of the brightness-chrominance detector. The response characteristic undergoes a sharp transition from the 41.25 megacycle sound-carrier frequency to the 41.75 megacycle frequency which represents the lowermost boundary of the desired transmission band.

In the receiver of FIGURE 1, which embodies the present invention, not only is substantially complete sound carrier rejection in the input signal to brightness-chrominance detector 28 accomplished, but the gain-bandwidth product for the brightness and chrominance signal components is greatly enhanced relative to that achieved with the prior art circuit of FIGURE 2. The improvement is apparent from a comparison of curve A of FIGURE 4, which represents the band-pass characteristic achieved with the circuit of FIGURE 1, with previously discussed curve C representative of the prior art circuit.

In the circuit of FIGURE 1, the amplified I.-F. composite color signal is impressed across primary winding 15 of intercoupling transformer 14. As in the circuit of FIGURE 2, opposite-polarity signals are developed in secondary and tertiary windings 16 and 17 respectively. The relationship between the polarities of the several windings is indicated by the use of conventional symbols in the drawing, with the lower terminal of secondary winding 16 and the upper terminal of tertiary winding 17 undergoing signal variations in the same direction as the upper terminal of primary winding 15. Trap circuit 19, 20 is tuned to a frequency slightly higher than the 41.25 megacycle sound-carrier frequency; in practice, it has been found that the desired results may be achieved by tuning this circuit to a frequency in the range from 41.25 to 41.75 megacycles. As in the circuit of FIGURE 2, sound-carrier frequency components of substantially equal magnitude but opposite polarity are developed in the input circuit to brightness-chrominance detector 28, to effect substantially complete sound-carrier rejection. However, in the circuit of FIGURE 1, embodying the invention, the sound-rejection trap circuit 21 comprises a coil which receives the composite signal from tertiary winding 17 whereas in the prior art circuit, the trap circuit 51, 57 is driven by magnetic coupling from primary winding. With the circuit of the invention, both primary winding 15 and secondary winding 16 may be separately tuned by respective tuning cores 29 and 30; such use of a double-tuned construction, which is not feasible in prior art cancellation circuits of the type shown in FIGURE 2, contributes to the realization of materially increased gain at the 41.75 megacycle color I.-F. pass-band corner and throughout the pass-band of the signal applied to the brightness-chrominance detector. The discrimination between the desired pass-band and the undesired sound-carrier component is also enhanced by the development of aiding-polarity signal components across the portion of coil 19 between its upper terminal and tap 38 at frequencies within the desired pass-band; as is known in the art, the signals developed across resonant circuit at frequencies above resonance are shifted in phase relative to the resonant-frequency components, and in practice this phase shift has been found to be sufficient at the 41.75 megacycle color edge of the pass-band and at higher frequencies within the pass-band, to result in the production of signal components in the trap circuit which augment, rather than cancel, the signal components developed across secondary winding 16. As a result of these considerations, the circuit of FIGURE 1 has been found to provide as much as a three decibel or 30% increase in gain of desired signal components to the brightness-chrominance detector, with no sacrifice in sound-carrier rejection, as compared with prior art cancellation circuits. Consequently, Y-amplifier 22 may receive an input signal which is correspondingly increased in magnitude relative to such prior art receivers; since the gain-bandwidth product of an amplifier is a fixed property of the active amplifying element, such a reduction in the gain requirement of the amplifier permits the attainment of a broader or flatter frequency response characteristic, leading to a reproduced image of greater fidelity than that achieved with prior art circuits. Alternatively the Y amplifier input may remain at its original prior art level and the increased transmission efficiency utilized to increase the overall sensitivity of the receiver and accordingly improve fringe area reception.

Figure 3:
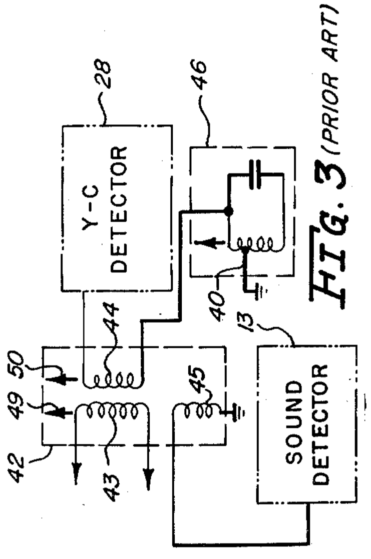
FIG. 3 (PRIOR ART)

The fragmentary circuit diagram of FIGURE 3, which is a typical intercoupling circuit of the trap type, has also been used in prior art color television receivers. The intermediate-frequency composite color television wave, after being amplified in the previous stages, is impressed across the primary winding 43 of interstage transformer 42 which also comprises a secondary winding 44 and a tertiary winding 45. The tertiary winding which is tightly coupled to the primary winding has one end connected to ground and the remaining end connected to a sound detector 13. Secondary winding 44 has one end connected to the picture detector 28 and the remaining end connected to a trap circuit 46 which is of the conventional type and is similar in construction to the trap circuit 21 of FIGURE 1. However, the tunable inductor of the trap circuit 46 has only one intermediate tap 40 and this tap is connected to ground. The transformer is housed in a conventional metallic shield can indicated by the dotted line surrounding the transformer 42 which has provisions for tuning both the primary and the secondary windings through the use of ferromagnetic cores 49 and 50, respectively.

The transformer windings 43, 44 and their associated distributed capacity (not shown) are double-tuned through the use of cores 49 and 50 to obtain maximum I.-F. signal transfer. The I.-F. composite color signal from I.-F. amplifier stage 12 is impressed upon primary winding 43 and is transferred in its entirety through tertiary winding 45 to detector stage 13. In general, secondary winding 44 has the I.-F. signal which is impressed on the primary 43 transferred to it at all frequencies which comprise the I.-F. composite color signal. Trap circuit 46 is of the conventional type and consists of a simple resonant circuit tuned to the 41.25 megacycle sound carrier frequency. At frequencies removed from this, trap circuit 46 offers little or no impedance to the signal transferred to the secondary winding and impressed upon detector 28. However, at the resonant frequency of the trap circuit the impedance of the circuit rises to such an extent that a major portion of the 41.25 megacycle sound signal component appears across the trap circuit and thus this signal component is deleted from the I.-F. composite color signal seen by the picture detector 28. To the I.-F. signal components at frequencies removed from the 41.25 megacycle sound component, this trap circuit offers substantially no impedance, and, as a result, they appear at the input of the picture detector.

Figure 5:
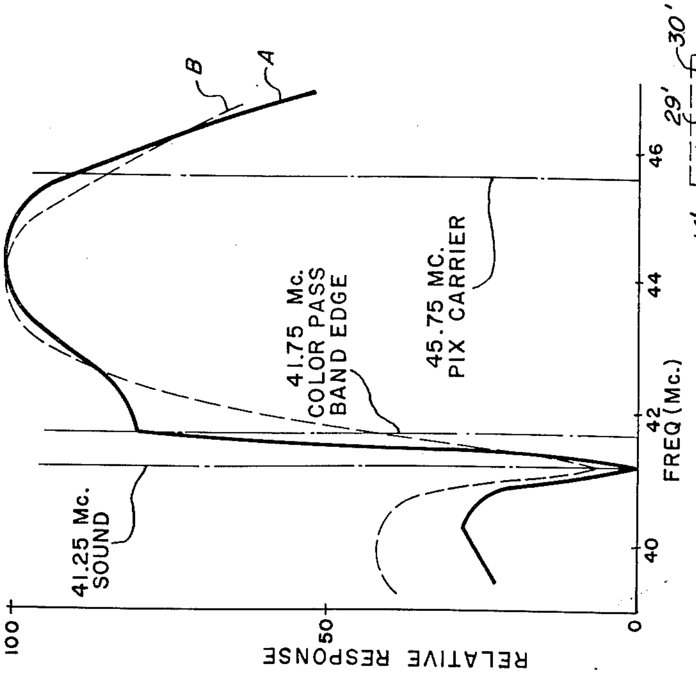

The gain-bandwidth characteristic of the I.-F. composite color signal applied to the picture detector of the intercoupling circuit of FIGURE 3 is illustrated by curve B of FIGURE 5. Here again the relative response or gain is shown as a function of frequency. Curve A, which is representative of the intermediate-frequency signal appearing at the detector of FIGURE 1 and is identical with the correspondingly designated curve in FIGURE 4, is again shown for purposes of comparison. As shown in curve B, which is representative of the prior art coupling network of FIGURE 3, the prior art intercoupling circuit provides less rejection of the sound signal component than the circuit of the invention. Moreover, the response of this prior art circuit at the 41.75 megacycle edge of the desired pass-band is only approximately half the response obtained with the embodiment of FIGURE 1. This undesirable loss of response at the pass-band edge results from the fact that the trap circuit still has appreciable impedance at frequencies near the sound signal component; the trap circuit does not generate voltages of additive or subtractive phases because there is no provision for injecting energy into it. This is typical of trap circuits of this type. Thus the relatively large response of the I.-F. composite signal at the 41.75 megacycle frequency which was produced through the adding of voltages generated by both the primary winding and the trap circuit 21 of the embodiment of FIGURE 1 is not present when the prior art circuit of FIGURE 3 is used. Although the overall gain-bandwidth characteristics of the intercoupling circuits represented by curves A and B in FIGURE 5 look somewhat similar, the relative responses of the two intercoupling circuits at the frequencies of greatest interest, the desired 41.75 megacycle pass-band edge component and the 41.25 sound signal component, reveal that the embodiment of the invention shown in FIGURE 1 has a twelve decibel increase in rejection of the sound component frequency and more than a six decibel increase in response at the 41.75 megacycle frequency over the prior art circuits. Here again, these improvements permit the attainment of a reproduced image of greater fidelity than that achieved with the prior art circuit.

Figure 6:
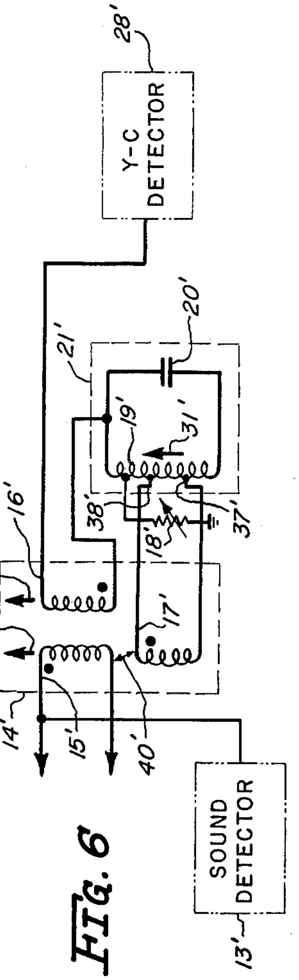
FIGURE 6 is a schematic diagram of a modified coupling circuit also embodying the invention and adapted for inclusion in a color television receiver of the type shown in FIGURE 1.

An alternate embodiment of the invention is shown in FIGURE 6. As also shown in the preferred embodiment of FIGURE 1, the tertiary winding 17′ of the transformer 14′ is connected to the trap circuit 21′. However, in FIGURE 6 variable resistor 18′ is connected to the resonant trap circuit 21′ at a point other than the tertiary winding input connection 38′. Resistor 18′ must be connected between ground and a portion of the trap circuit between the positive-going side of the tertiary winding and the coincidentally positive-going side of the secondary winding. A connection of this type produces substantially identical results to those obtained with the intercoupling network of FIGURE 1. The remaining elements of the embodiment of FIGURE 6 correspond to similar elements of the preferred embodiment of FIGURE 1 and are denoted by the use of corresponding primed reference numerals.

Merely by way of illustration and in no sense by way of limitation, the following circuit component values may be employed in the preferred form of the I.-F. intercoupling network of FIGURE 1.

| | | |
|---|---|---|
| Primary winding 15 | turns | 13 |
| Secondary winding 16 | turns | 23 |
| Tertiary winding 17 | turns | 1¼ |
| Portion of inductor 19 between tap 38 and connection to secondary winding 16 | turns | 2¼ |
| Portion of inductor 19 connected in parallel to tertiary winding | turns | 1 |
| Remaining portion of inductor 19 | turns | 3¾ |
| Capacitor 33 | micro-microfarads | 6 |
| Resistor 36 | ohms | 4000 |
| Capacitor 20 | micro-microfarads | 53 |
| Resistor 18 | ohms | 0–100 |

Thus the present invention provides a new and improved intermediate-frequency composite color signal interstage coupling network which achieves both adequate sound signal rejection and adequate signal response at the desired color edge of the pass-band, while improving overall circuit gain and bandwidth.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. An intermediate frequency coupling network for a color television receiver for translating an intermediate frequency signal including video components and a sound signal component and for attenuating the sound frequency component, said network comprising: a transformer having a primary winding, a secondary winding inductively coupled to said primary winding, and a tertiary winding tightly inductively coupled to one of the aforementioned windings; a resonant circuit including an inductor separate from said windings and tuned approximately to the frequency of said sound component, at least a portion of which resonant circuit is coupled in parallel across said tertiary winding and one end of which is coupled to one end of said secondary winding; means for impressing said intermediate frequency signal across said primary winding; and an output circuit including said secondary winding and at least a portion of said resonant circuit coupled in series opposition for developing voltages of opposing phase and substantially equal magnitude at a frequency corresponding to said sound frequency component.

2. An intermediate frequency coupling network for a color television receiver for translating an intermediate frequency signal including video components and a sound signal component and for attenuating the sound frequency component, said network comprising: a transformer having a primary winding, a secondary winding inductively coupled to said primary winding, and a tertiary winding tightly inductively coupled to one of the aforementioned windings; a resonant circuit including an inductor separate from said windings and tuned approximately to the frequency of said sound component, at least a portion of which resonant circuit is coupled in parallel across said tertiary winding and one end of which is coupled to one end of said secondary winding; means for impressing said intermediate frequency signal across said primary winding; an output circuit including said secondary winding and at least a portion of said resonant circuit coupled in series opposition for developing voltages of opposing phase at a frequency corresponding to said sound frequency component; and an adjustable impedance included in said output circuit for varying the relative values of the aforementioned voltages and the amount of attenuation of said sound frequency component.

3. An intermediate frequency coupling network for a color television receiver for translating an intermediate frequency signal including video components and a sound signal component and for attenuating the sound frequency component, said network comprising: a transformer tuned to the intermediate frequency of said receiver having a primary winding, a secondary winding inductively coupled to said primary winding, and a tertiary winding wound bifilarly with one of the aforementioned windings; a resonant circuit including an inductor separate from said windings and tuned approximately to the frequency of said sound component, at least a portion of which resonant circuit is coupled in parallel across said tertiary winding and one end of which is coupled to one end of said secondary winding; means for impressing said intermediate frequency signal across said primary winding; and an output circuit including said secondary winding and at least a portion of said resonant circuit coupled in series opposition for developing voltages of opposing phase and substantially equal magnitude at a frequency corresponding to said sound frequency component.

4. An intermediate frequency coupling network for a color television receiver for translating an intermediate frequency signal including video components and a sound signal component and for attenuating the sound frequency component, said network comprising: a transformer tuned to the intermediate frequency of said receiver having a primary winding, a secondary winding inductively coupled to said primary winding, and a tertiary winding wound bifilarly with one of the aforementioned windings; a resonant circuit including an inductor separate from said windings and tuned approximately to the frequency of said sound component, at least a portion of which resonant circuit is coupled in parallel across said tertiary winding and one end of which is coupled to one end of said secondary winding; means for impressing said intermediate frequency signal across said primary winding; an output circuit including said secondary winding and at least a portion of said resonant circuit coupled in series opposition for developing voltages of opposing phase at a frequency corresponding to said sound frequency component; and an adjustable impedance included in said output circuit and connected to said tertiary winding and said trap circuit for varying the relative values of the aforementioned voltages and the amount of attenuation of said sound frequency component.

5. An intermediate frequency coupling network for a color television receiver for translating an intermediate frequency signal including video components and a sound signal component and for attenuating the sound frequency component, said network comprising: a transformer tuned to the intermediate frequency of said receiver having a primary winding, a secondary winding inductively coupled to said primary winding, and a tertiary winding tightly inductively coupled to one of the aforementioned windings; a resonant circuit tuned approximately to the frequency of said sound component having an inductive element separate from said windings and at least a portion of which is coupled in parallel across said tertiary winding and one end of which is coupled to one end of said secondary winding; means for impressing said intermediate frequency signal across said primary winding; and an output circuit including said secondary winding and at least a portion of said inductive element of said resonant circuit coupled in series oppositon for developing voltages of opposing phase and substantially equal magnitude at a frequency corresponding to said sound frequency component.

References Cited in the file of this patent

UNITED STATES PATENTS 2,907,960 Avins ------------------- Oct. 6, 1959

FOREIGN PATENTS 710,535 France ----------------- Aug. 24, 1931